(12) United States Patent
Huang

(10) Patent No.: US 10,678,105 B2
(45) Date of Patent: Jun. 9, 2020

(54) ARRAY SUBSTRATE AND MANUFACTURING METHOD THEREOF AND LIQUID CRYSTAL DISPLAY APPARATUS

(71) Applicant: Shenzhen China Star Optoelectronics Technology Co., Ltd., Shenzhen, Guangdong (CN)

(72) Inventor: Qiuping Huang, Guangdong (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 0 days.

(21) Appl. No.: 15/114,162

(22) PCT Filed: Jun. 29, 2016

(86) PCT No.: PCT/CN2016/087678
§ 371 (c)(1),
(2) Date: Jul. 26, 2016

(87) PCT Pub. No.: WO2017/215039
PCT Pub. Date: Dec. 21, 2017

(65) Prior Publication Data
US 2018/0173067 A1 Jun. 21, 2018

(30) Foreign Application Priority Data
Jun. 17, 2016 (CN) .......................... 2016 1 0439282

(51) Int. Cl.
*G02F 1/1362* (2006.01)
*G02F 1/1333* (2006.01)
*G02F 1/1343* (2006.01)

(52) U.S. Cl.
CPC ...... *G02F 1/136286* (2013.01); *G02F 1/1343* (2013.01); *G02F 1/133345* (2013.01)

(58) Field of Classification Search
CPC . G02F 1/1345–13458; G02F 1/133345; G02F 1/136286; G02F 1/1343; G02F 2001/13629
See application file for complete search history.

(56) References Cited

U.S. PATENT DOCUMENTS

2010/0321624 A1* 12/2010 Yanagisawa .......... G02F 1/1345
349/152
2012/0139852 A1 6/2012 Huang
(Continued)

FOREIGN PATENT DOCUMENTS

CN       101013214 A    8/2007
CN       201307201 Y    9/2009
(Continued)

OTHER PUBLICATIONS

CN_2016104392824—2nd OA.

Primary Examiner — Michael H Caley
Assistant Examiner — Mariam Qureshi
(74) Attorney, Agent, or Firm — Andrew C. Cheng

(57) ABSTRACT

The present disclosure provides an array substrate, including a plurality of first ITO wirings and a substrate, a common electrode layer, a first insulating layer and a conductive layer arranged sequentially stacked, the plurality of gate lines, the plurality of first ITO wirings and the plurality of conductive mediums are sequentially arranged end to end as spirally. The gate line, the first ITO wiring and the conductive medium are formed an impedance in the work process of the present disclosure to filter the interference of the high-frequency signal in the display process to improve the display effect and reduce the production costs. The present disclosure further provides the above manufacturing method for the array substrate and uses the LCD of the above array substrate.

9 Claims, 2 Drawing Sheets

(56) References Cited

U.S. PATENT DOCUMENTS

2012/0256316 A1* 10/2012 Lan ................... G02F 1/136286
                                                          257/749
2015/0009438 A1*  1/2015 Du ........................ G02F 1/1345
                                                          349/42
2015/0316802 A1* 11/2015 Takanishi ............ H01L 27/1244
                                                          349/43

FOREIGN PATENT DOCUMENTS

| CN | 103926773 A | 7/2014 |
| CN | 106653771 A | 5/2017 |
| JP | 2007220397 A | 8/2007 |

* cited by examiner

ARRAY SUBSTRATE AND MANUFACTURING METHOD THEREOF AND LIQUID CRYSTAL DISPLAY APPARATUS

CROSS REFERENCE

The present disclosure claims the priority of No. 201610439282.4, entitled "array substrate and manufacturing method thereof and liquid crystal display apparatus", filed on Jun. 17, 2016, the disclosure of which is incorporated herein by reference in its entirety.

FIELD OF THE DISCLOSURE

The present disclosure relates to a display technology field, and more particularly to an array substrate and manufacturing method thereof and a liquid crystal display apparatus.

BACKGROUND OF THE DISCLOSURE

With the development of display technology, liquid crystal display (LCD) and other flat panel display apparatus is advantageous because of its high-definition, wide power, thin body and applications, etc., and is widely used in mobile phones, TV, personal digital assistants, digital cameras, notebook computers, desktop computers and other consumer electronics products, a display device in the mainstream.

In the existing wireless communicating or high-speed operating electronic devices, the LCDs are often affected by the electromagnetic noise generated by the high frequency circuit, such that a voltage fluctuation is generated in the LCD to reduce the display quality. To reduce the effect of electromagnetic noise, the inductance device in the LCD is usually required to form an impedance and filter out high frequency signals. Therefore, the structure of the LCD also makes more complex and increases the manufacturing costs.

SUMMARY OF THE DISCLOSURE

The object of the present disclosure is providing an array substrate and the manufacturing method thereof, can effectively filter the high frequency interference signals during the display to improve the display quality of the liquid crystal display.

Another object of the present disclosure is providing a LCD, using the above array substrate.

To achieve the above object, the embodiment of the present disclosure provides the following technical solutions:

The present disclosure provides an array substrate, including a plurality of first ITO wirings and a substrate, a common electrode layer, a first insulating layer and a conductive layer arranged sequentially stacked, the common electrode layer includes a plurality of gate lines arranged spaced, the conductive layer includes a plurality of conductive mediums arranged spaced, the plurality of conductive mediums are sequentially arranged with the gate line on the projection of the common electrode layer, the first insulating layer is arranged a first via hole on the corresponding position of the end portion of the each gate line, the each first ITO wirings is connected with the adjacent gate line and conductive medium through the first via hole, the plurality of gate lines, the plurality of first ITO wirings and the plurality of conductive mediums are sequentially arranged end to end as spirally.

Wherein, the conductive medium is data line.

Wherein, further includes a second insulating layer, the second insulating layer is overlaid on the conductive layer, the first via hole runs through the first insulating layer and the second insulating layer, the second insulating layer is further arranged a plurality of second via holes, the second via hole leads to the end of the data line, the each first ITO wirings is connected with the adjacent gate line and data line through the first via hole and the second via hole.

Wherein, the conductive medium is second ITO wiring, the first ITO wiring and the second ITO wiring are integrally molded.

Wherein, the first insulating layer includes an upper insulating layer and a lower insulating layer arranged stacked, the first via hole runs through the lower insulating layer and the upper insulating layer.

The present disclosure provides a LCD, including a color film substrate, a liquid crystal layer and an array substrate, the liquid crystal layer is sandwiched between the array substrate and the color film substrate, the array substrate includes a plurality of first ITO wirings and a substrate, a common electrode layer, a first insulating layer and a conductive layer arranged sequentially stacked, the common electrode layer includes a plurality of gate lines arranged spaced, the conductive layer includes a plurality of conductive mediums arranged spaced, the plurality of conductive mediums are sequentially arranged with the gate line on the projection of the common electrode layer, the first insulating layer is arranged a first via hole on the corresponding position of the end portion of the each gate lines, the each first ITO wirings is connected with the adjacent gate line and conductive medium through the first via hole, the plurality of gate lines, the plurality of first ITO wirings and the plurality of conductive mediums are sequentially arranged end to end as spirally.

Wherein, the conductive medium is data line.

Wherein, further includes a second insulating layer, the second insulating layer is overlaid on the conductive layer, the first via hole runs through the first insulating layer and the second insulating layer, the second insulating layer is further arranged a plurality of second via holes, the second via hole leads to the end of the data line, the each first ITO wirings is connected with the adjacent gate line and data line through the first via hole and the second via hole.

Wherein, the conductive medium is second ITO wiring, the first ITO wiring and the second ITO wiring are integrally molded.

Wherein, the first insulating layer includes an upper insulating layer and a lower insulating layer arranged stacked, the first via hole runs through the lower insulating layer and the upper insulating layer.

The present disclosure provides a method for manufacturing an array substrate, including: forming a common electrode layer including a plurality of gate lines arranged spaced on the substrate; forming a first insulating layer overlaid on the common electrode layer on the substrate; forming a conductive layer on the first insulating layer, the conductive layer includes a plurality of data lines arranged spaced, and the projection of the plurality of data lines on the common electrode layer are sequentially arranged with the gate line; forming a first via hole with the corresponding position of the end portion of the each gate lines on the first insulating layer; forming a first ITO wiring in the first via hole, the first ITO wiring is connected with the adjacent gate line and the data line, such that the plurality of gate lines, the plurality of first ITO wirings and the plurality of data lines are sequentially arranged end to end as spirally.

Wherein, further includes forming a second insulating layer on the conductive layer; the step of arranging a first via hole with the corresponding position of the gate line on the first insulating layer includes: forming the first via hole through the second insulating layer on the first insulating layer; forming a second via hole connected the end of the data line on the second insulating layer; the step of forming a first ITO wiring in the first via hole and the first ITO wiring connected with the adjacent gate line and data line includes: forming a first ITO wiring in the first via hole and the second via hole, the each first ITO wirings is connected with the adjacent gate line and data line through the first via hole and the second via hole.

The present disclosure provides a method for manufacturing an array substrate, including: forming a common electrode layer including a plurality of gate lines arranged spaced on the substrate; forming a first insulating layer overlaid on the common electrode layer on the substrate; forming a first via hole with the corresponding position of the end of the each gate lines on the first insulating layer; forming a ITO wiring layer, includes: forming a first ITO wiring in the first via hole, forming a plurality of second ITO wirings arranged spaced on the insulating layer, the plurality of second ITO wirings are sequentially arranged with the gate line on the projection of the common electrode, the first ITO wiring is connected with the adjacent gate line and second ITO wiring, such that the plurality of gate lines, the plurality of first ITO wirings and the plurality of second ITO wirings are sequentially arranged end to end as spirally.

Wherein, in the step of forming a first insulating layer overlaid on the common electrode layer on the substrate, includes: forming a lower insulating layer on the common electrode layer; forming an upper insulating layer on the lower insulating layer.

The embodiment of the present disclosure has the following advantages or advantageous effects:

The plurality of gate lines, the plurality of first ITO wirings and the plurality of conductive mediums of the array substrate of the present disclosure are sequentially formed end to end and the space arranged as spirally. The plurality gate lines, the plurality of first ITO wirings and the plurality of conductive mediums arranged spirally may be formed an impedance in the work process to filter the interference of the high-frequency signal in the display process to improve the display quality of the LCD, at the same time, eliminating the inductance device in the LCD and reducing the production costs. The present disclosure further provides the above method for manufacturing array substrate and the LCD using the above array substrate, can effectively filter the interference of the high-frequency signal in the display process to improve the display quality of the LCD.

BRIEF DESCRIPTION OF THE DRAWINGS

In order to more clearly illustrate the embodiments or the prior art technical solutions embodiment of the present disclosure, it will implement the following figures for the cases described in the prior art or the need to use a simple introduction. Apparently, the following description the drawings are only some embodiments of the present disclosure, those of ordinary skill in speaking, without creative efforts of the premise, but also can derive other drawings from these drawings.

DETAILED DESCRIPTION OF PREFERRED EMBODIMENTS

The present disclosure will now be combined with the implementation of the accompanying drawings, were clear examples of technical solutions of the present disclosure, fully described, it is clear that the described embodiments are merely part of the embodiments of the present disclosure, but not all embodiments Example. Based on the embodiments of the present disclosure, those of ordinary skill in not making all other embodiments without creative efforts obtained, are within the scope of the present disclosure is protected.

Figure 1:
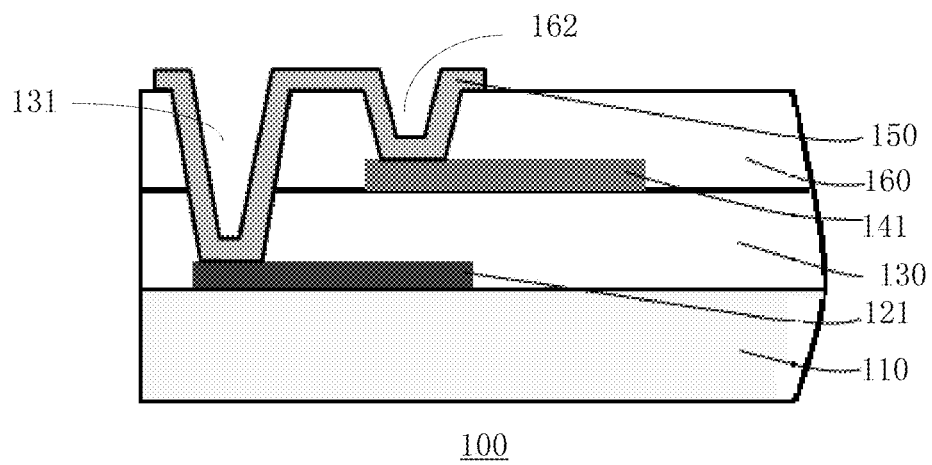
FIG. 1 is a sectional schematic of the array substrate of the first embodiment of the present disclosure.
Figure 2:
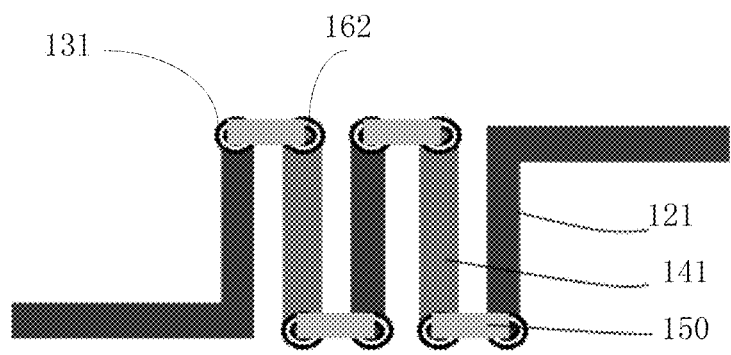
FIG. 2 is a schematic plan view of the array substrate of the FIG. 1.

Please refer to FIG. 1 and FIG. 2, in the first embodiment of the present disclosure, the array substrate 100 includes a substrate 110, a common electrode layer (not numbered), a first insulating layer 130, a conductive layer (not numbered) and a plurality of first ITO wirings 150. The common electrode layer is formed on the substrate 110, the common electrode layer includes a plurality of common electrode lines and a plurality of gate lines 121, the plurality of gate lines 121 are arranged spaced, when forming the common electrode layer, the common electrode line and the plurality of gate lines 121 can be formed by the mask etching process. The first insulating layer 130 is overlaid on the common electrode layer, the conductive layer is arranged on the first insulating layer 130. The conductive layer includes a plurality of data lines 141 (i.e. conductive medium) arranged spaced. The data line 141 is sequentially arranged with the gate line 121 on the projection of the common electrode layer. That is, the data line 141 on the projection of the common electrode layer is between the adjacent two gate lines 121. The corresponding positions of the ends of the each gate lines 121 on the first insulating layer 130 are provided with via holes 131. The each first ITO wirings 150 is connected with the adjacent gate line 121 and data line 141 through the first via hole 131. The plurality of gate lines 121, the plurality of first ITO wirings 150 and the plurality of data lines 141 are sequentially arranged end to end as spirally. That was arranged in the following manner: the gate line 121—the first ITO wiring 150—the data line 141—the first ITO wiring 150—the gate line 121 . . . the first ITO wiring 150—the gate line 121, and the space arranged as spirally. Wherein, the two ends of the data line 141/gate line 121 in the middle are respectively connected a first ITO wiring 150.

The plurality of gate lines, the plurality of first ITO wirings and the plurality of conductive mediums of the array substrate of the present disclosure are sequentially formed end to end and the space arranged as spirally. The plurality gate lines, the plurality of first ITO wirings and the plurality of conductive mediums arranged spirally may be formed an impedance in the work process to filter the interference of the high-frequency signal in the display process to improve the display quality of the LCD, at the same time, eliminating the inductance device in the LCD and reducing the production costs.

Further specifically, further includes a second insulating layer 160 in the present embodiment. The second insulating layer 160 is overlaid on the conductive layer. The first via hole 131 is runs through the first insulating layer 130 and the second insulating layer 160 at same time. The second insulating layer 160 is further arranged a plurality of second via hole 162. The second via hole 162 leads to the each ends of the data lines 141, the end of the data line 141 is connected with the first ITO wiring 150. The first ITO wiring 150 in the first via hole 161 is connected with the first ITO wiring 150 in the second via hole 162. That is, the first ITO wiring 150 is connected with the adjacent gate line 121 and data line 141 through the first via hole 131 and the second via hole 162.

Figure 3:
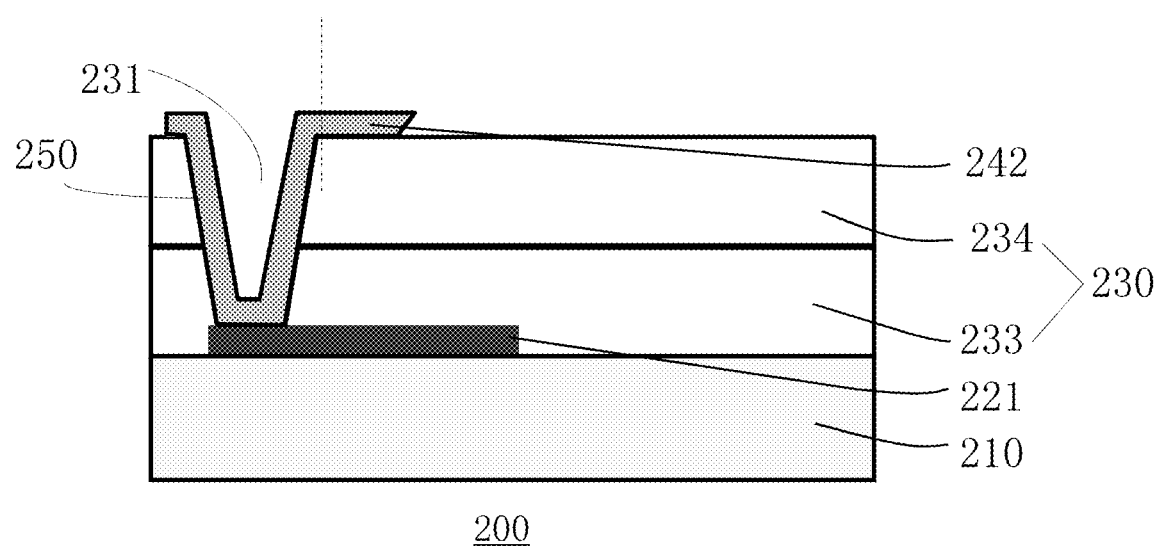
FIG. 3 is a sectional schematic of the array substrate of the second embodiment of the present disclosure.
Figure 4:
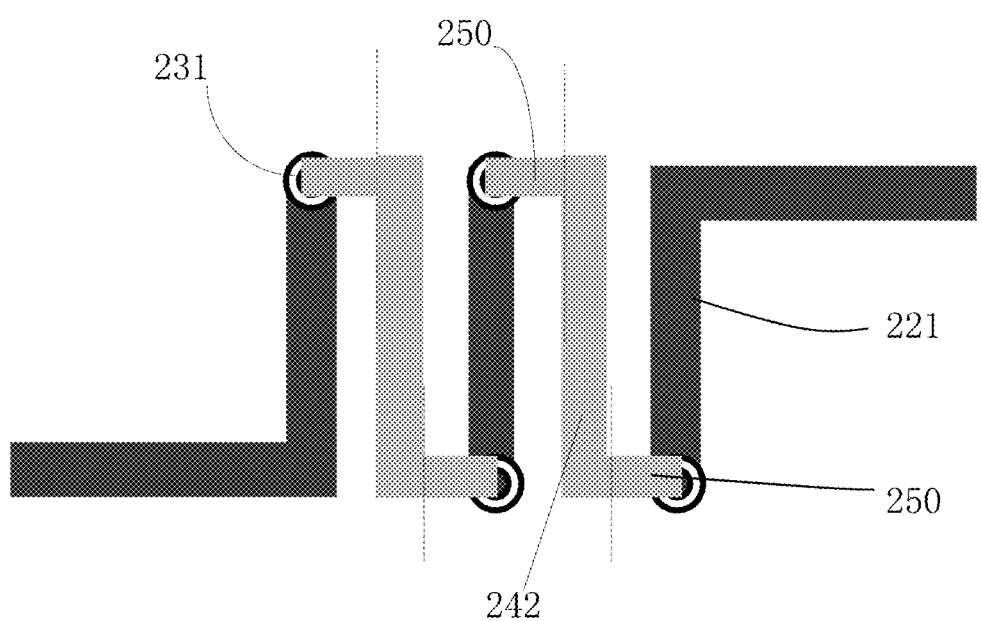
FIG. 4 is a schematic plan view of the array substrate of the FIG. 3.

Please refer to FIG. 3 and FIG. 4, in the second embodiment of the present disclosure, the array substrate 200 includes a substrate 210, a common electrode layer, a first insulating layer 230, a conductive layer and a plurality of first ITO wirings 250. The common electrode layer is formed on the substrate 210, the common electrode layer includes a plurality of gate lines 221 arranged spaced. The first insulating layer 230 includes a lower insulating 233 and an upper 234 arranged stacked, the lower insulating layer 233 is overlaid on the common electrode layer. It is appreciated, the data line (not shown) is formed on the lower insulating layer 233, and the upper insulating layer 234 is arranged on the lower insulating layer 233 and overlaid on the data line. A first via hole 231 is arranged on the lower insulating layer 233 and the upper insulating layer 234 and runs through the lower insulating layer 233 and the upper insulating layer 234. The first via hole 231 leads to the end of the gate line 221. the first ITO wiring 250 is arranged in the first via hole 231, the first ITO wiring 250 is connected with the end of the gate line 221. The conductive layer is arranged on the upper insulating layer 234, the conductive layer includes a plurality of second ITO wirings 242 (conductive mediums) arranged spaced, the second ITO wiring 242 is sequentially arranged with the gate line 221 on the projection of the common electrode layer. That is, the second ITO wiring 242 is between the adjacent two gate lines 221 on the projection of the common electrode layer. The each first ITO wirings 250 is connected with the adjacent gate line 221 and data line 241 through the first via hole 231. The plurality of gate lines 221, the plurality of first ITO wirings 250 and the plurality of data lines 241 are sequentially arranged end to end as spirally. That was arranged in the following manner: the gate line 221—the first ITO wiring 250—the second ITO wiring 242—the first ITO wiring 250—the gate line 221 . . . . the first ITO wiring 250—the gate line 221, and the space arranged as spirally. Wherein, the two ends of the second ITO wiring 242 (gate line 221) in the middle are respectively connected a first ITO wiring 250.

It is appreciated, the first ITO wiring 250 and the second ITO wiring 242 may be formed by the pixel electrode process at the same time. The first ITO wiring 250 and the second ITO wiring 242 are same material and integrally formed.

The present disclosure further provides a liquid crystal display device, mainly including the array substrate and the color film substrate arranged opposite and a liquid crystal layer sandwiched between the array substrate and the color film substrate, the array substrate is according to any one of the above-mentioned array substrate.

The present disclosure also provides a method for manufacturing an array substrate according to the first embodiment, mainly including the following steps:

S101: forming a common electrode layer on the substrate, the common electrode layer includes a plurality of gate lines arranged spaced.

Specifically, the gate line arranged spaced may be manufactured on the substrate by the mask process.

S103: forming a first insulating layer overlaid on the common electrode layer on the substrate.

It is appreciated, the area of the common electrode layer is usually less than the area of the substrate, therefore, in order to completely cover the common electrode layer, may be formed a first insulating layer overlaid on the common electrode layer on the substrate by the chemical deposition mode. That is, the first insulating layer not only completely covering the common electrode layer but also covering some areas without arranged the common electrode layer on the substrate.

S105: forming a conductive layer on the insulating layer, the insulating layer includes a plurality of conductive mediums arranged spaced, and the plurality of conductive mediums are sequentially arranged with the gate line on the projection of the common electrode layer.

Specifically, the conductive medium is data line, manufacturing the data line arranged spaced on the first insulating layer by the mask process.

S106: forming a second insulating layer on the conductive layer.

The second insulating layer is overlaid on the data line on the conductive layer.

S107: arranging a first via hole with the corresponding position of the end of the gate line on the first insulating layer.

Specifically, forming the first via hole through the first insulating layer and connecting the third via hole of the end of the data line by the via etching process on the second insulating layer. That is, the first via hole runs through the first insulating layer and the second insulating layer to lead to the end of the gate line. The second via hole leads to the second insulating layer to lead to the end of the data line.

S109: forming a first ITO wiring in the first via hole, the first ITO wiring is connected with the adjacent gate line and data line through the first via hole, such that the plurality of gate lines, the first ITO wiring and the plurality of conductive mediums are sequentially arranged end to end as spirally.

Specifically, forming a first ITO wiring by the pixel electrode process on the second insulating layer and in the first via hole and the second via hole. The each first ITO wirings is connected with the adjacent gate line and data line through the first via hole and the second via hole.

The present disclosure also provides a method for manufacturing an array substrate according to the second embodiment, mainly including the following steps:

S201: forming a common electrode layer on the substrate, the common electrode layer includes a plurality of gate lines arranged spaced.

Specifically, the common electrode layer includes a common electrode line and a gate line. When forming a common electrode layer by the mask process on the substrate, etching the common electrode line and the spaced gate line at same time.

S203: forming a first insulating layer overlaid the common electrode layer on the substrate.

The first insulating layer includes a lower insulating layer and an upper insulating layer arranged stacked. Specifically, forming a lower insulating layer on the common electrode layer first, and forming a data line on the lower insulating layer, further forming the upper insulating layer on the data line. That is, the lower insulating layer is forming on the upper insulating layer.

S205: forming first via holes with the corresponding position of the ends of the each gate lines on the first insulating layer.

That is, forming a first via hole on the upper insulating layer and the lower insulating layer, the first via hole runs through the upper insulating layer and the lower insulating layer to connect to the end of the gate line.

S207: forming an ITO wiring layer, includes: forming a first ITO wiring in the first via hole, forming a plurality of second ITO wirings arranged spaced on the insulating layer, the plurality of second ITO wirings are sequentially arranged with the gate line on the projection of the common electrode, the first ITO wiring is connected with the adjacent gate line and second ITO wiring, such that the plurality of gate lines, the plurality of first ITO wirings and the plurality of second ITO wirings are sequentially arranged end to end as spirally.

It is appreciated, the material of the first ITO wiring and the second ITO wiring are the same. The manufacturing for the first ITO wiring and the second ITO wiring in the present embodiment may be simultaneously generated in the same manufacturing process. For example, manufacturing the first ITO wiring and the second ITO wiring by the pixel electrode process on the first via hole and the upper insulating layer at same time.

It is appreciated, in the other embodiment, after generating the second ITO wiring on the upper insulating layer, generate the first via hole, and finally the first ITO wiring and the second ITO wiring are formed.

In the description of the present specification, reference to the term "one embodiment," "some embodiments", "an example", "concrete example", or "some examples" and the description is meant in connection with the embodiment or example described The particular feature, structure, material, or characteristic included in the utility model at least one embodiment or example. In the present specification, the term of the above schematic representation is not necessarily for the same embodiment or example. Furthermore, the particular features, structures, materials, or characteristics described in any one or more of the exemplary embodiment in a suitable manner or in combination.

Above embodiment, wherein not intended to limit the scope of protection of the technology program. Any modifications within the spirit and principles of the above embodiment made, equivalent replacement and improvement should be included within the scope of the technical solution.

What is claimed is:

1. An array substrate, comprising a plurality of first ITO wirings and also comprising a substrate, a common electrode layer, a first insulating layer and a conductive layer that are sequentially stacked, wherein the common electrode layer comprises a plurality of gate lines that are arranged to extend in a first direction and are spaced from each other in a second direction that is different from the first direction; the conductive layer comprises a plurality of conductive mediums that are arranged coextensive with the plurality of gate lines and are spaced from each other in the second direction, the plurality of conductive mediums being alternate with and spaced from the plurality of gate lines in the first second direction, such that each of the plurality of gate lines is adjacent to one of the plurality of conductive mediums; the first insulating layer is formed with a first via hole corresponding, in position, to one end portion of each of the plurality of gate lines, wherein each of the first ITO wirings has a first portion that is connected with one of the plurality of gate lines through the first via hole and a second portion that is connected with one of the plurality of conductive mediums that is adjacent to the one of the plurality of gate lines in the second direction, such that the plurality of gate lines, the plurality of first ITO wirings and the plurality of conductive mediums are sequentially connected to form a zig-zag shape, wherein at least one of the plurality of gate lines comprises two opposite end portions that are respectively connected to two of the plurality of first ITO wirings, the two first ITO wirings being extended in opposite directions to connect to two of the plurality of conductive mediums that are arranged on two opposite sides of the at least one of the plurality of gate lines.

2. The array substrate according to claim 1, wherein the plurality of conductive mediums comprise connection lines.

3. The array substrate according to claim 2, wherein the array substrate further comprises a second insulating layer overlaid on the conductive layer, and each of the first via holes runs through the first insulating layer and the second insulating layer, the second insulating layer being formed with a plurality of second via holes each leading to an end of one of the connection lines, each of the first ITO wirings being connected with one of the gate lines and one of the connection lines that is adjacent to the one of the gate lines through the first via hole and the second via hole.

4. The array substrate according to claim 1, wherein the conductive mediums comprise second ITO wirings, each of which is connected to a corresponding one of the first ITO wirings.

5. The array substrate according to claim 4, wherein the first insulating layer comprises an upper insulating layer and a lower insulating layer stacked on each other, and the first via hole runs through the lower insulating layer and the upper insulating layer.

6. A method for manufacturing an array substrate, wherein the method comprises: forming a common electrode layer comprising a plurality of gate lines on a substrate, the plurality of gate lines being arranged to extend in a first direction and spaced from each other in a second direction that is different from the first direction; forming a first insulating layer overlaid on the common electrode layer on the substrate; forming a conductive layer on the first insulating layer, wherein the conductive layer comprises a plurality of connection lines that are arranged coextensive with the plurality of gate lines and are spaced from each other in the second direction, the plurality of connection lines being alternate with and spaced from the plurality of gate lines in the second direction, such that each of the plurality of gate lines is adjacent to one of the plurality of connection lines; forming a first via hole in the first insulating layer to correspond, in position, to an end portion of each of the plurality of gate lines; forming a plurality of first ITO wirings, wherein each of the first ITO wirings has a first portion that is connected with one of the plurality of gate lines through one of the first via holes and a second portion that is connected with one of the plurality of connection lines that is adjacent to the one of the plurality of gate lines in the second direction, such that the plurality of gate lines, the plurality of first ITO wirings and the plurality of connection lines are sequentially connected to form a zig-zag shape, wherein at least one of the plurality of gate lines comprises two opposite end portions that are respectively connected to two of the plurality of first ITO wirings, the two first ITO wirings being extended in opposite directions to connect to two of the plurality of connection lines that are arranged on two opposite sides of the at least one of the plurality of gate lines.

7. The method for manufacturing array substrate according to claim 6, wherein the method further comprises forming a second insulating layer on the conductive layer;

the step of forming a first via hole in the first insulating layer to correspond, in position, to an end portion of each of the plurality of gate lines comprises: forming the first via hole in the first insulating layer and further extending through the second insulating layer; forming a second via hole in the second insulating layer to connect to an end of each of the plurality of connection lines; and the step of forming a plurality of first ITO wirings comprises: forming a plurality of first ITO wirings such that each of the plurality of first ITO wirings is connected with one of the plurality of gate lines and one of the plurality of connection lines through the first via hole and the second via hole, respectively.

8. A method for manufacturing an array substrate, wherein the method comprises: forming a common electrode layer comprising a plurality of gate lines on a substrate, the plurality of gate lines being arranged to extend in a first direction and spaced from each other in a second direction that is different from the first direction; forming a first insulating layer overlaid on the common electrode layer on the substrate; forming a first via hole in the first insulating layer to correspond, in position, to an end portion of each of the plurality of gate lines; forming ITO wirings, comprising: a plurality of first ITO wirings and a plurality of second ITO wirings on the insulating layer to be coextensive with the plurality of gate lines and spaced from each other in the second direction, the plurality of second ITO wirings being arranged alternate with and spaced from the plurality of gate lines in the second direction, such that each of the plurality of gate lines is adjacent to one of the plurality of second ITO wirings, wherein each of the plurality of first ITO wirings has a first portion that is connected with one of the plurality of gate lines and one of the plurality of second ITO wirings that is adjacent to the one of the plurality of gate lines in the second direction, such that the plurality of gate lines, the plurality of first ITO wirings and the plurality of second ITO wirings are sequentially connected to form a zig-zag shape, wherein at least one of the plurality of gate lines comprises two opposite end portions that are respectively connected to two of the plurality of first ITO wirings, the two first ITO wirings being extended in opposite directions to connect to two of the plurality of second ITO wirings that are arranged on two opposite sides of the at least one of the plurality of gate lines.

9. The method for manufacturing array substrate according to claim 8, wherein the step of forming a first insulating layer overlaid on the common electrode layer on the substrate comprises: forming a lower insulating layer on the common electrode layer; and forming an upper insulating layer on the lower insulating layer.

* * * * *